United States Patent
Griffiths et al.

(10) Patent No.: US 6,213,864 B1
(45) Date of Patent: Apr. 10, 2001

(54) WATER INJECTION SYSTEM FOR POULTRY CROP REMOVER

(75) Inventors: Terry C. Griffiths, Carlton; Gary M. Gilbreth, Claxton, both of GA (US)

(73) Assignee: Water Management Resources, A division of 3G Group Sales, Inc., Troy, IL (US)

( * ) Notice: Subject to any disclaimer, the term of this patent is extended or adjusted under 35 U.S.C. 154(b) by 0 days.

(21) Appl. No.: 09/472,296

(22) Filed: Dec. 27, 1999

(51) Int. Cl.$^7$ ........................................... A22C 5/00
(52) U.S. Cl. ........................ 452/173; 452/116; 452/117
(58) Field of Search .................................. 452/173, 123, 452/116, 117, 118

(56) References Cited

U.S. PATENT DOCUMENTS

| | | |
|---|---|---|
| 2,054,576 | 9/1936 | Waugh . |
| 2,536,826 | 1/1951 | Taus . |
| 3,137,031 | 6/1964 | Ine et al. . |
| 3,803,669 * | 4/1974 | Dillon ................................. 452/173 |
| 4,106,161 | 8/1978 | Niccolls . |
| 4,535,509 | 8/1985 | Bullock et al. . |
| 4,876,767 | 10/1989 | Harben, III et al. . |
| 4,882,811 | 11/1989 | Ewing . |
| 4,899,421 | 2/1990 | Van der Eerden . |
| 5,041,054 | 8/1991 | Van den Nieuwelaar . |
| 5,628,680 | 5/1997 | Hjorth . |
| 5,879,732 | 3/1999 | Caracciolo, Jr. et al. . |
| 6,027,403 * | 2/2000 | Hazenbroek et al. ............... 452/123 |
| 6,093,093 * | 7/2000 | Mostoller et al. ................... 452/123 |

\* cited by examiner

*Primary Examiner*—Willis Little
(74) *Attorney, Agent, or Firm*—Ronald E. Smith; Smith & Hopen, P.A.

(57) ABSTRACT

Water is conserved and poultry raised for human consumption is cleaned by a viscera-removing machine that incorporates a unique nozzle member positioned adjacent a crop-removing tool. The close positioning of the nozzle to the crop-removing tool insures that contaminates are washed out of the internal cavity of the bird immediately upon crop removal. This prevents contaminates from being absorbed into tissue surrounding the internal cavity. The nozzle is mounted in longitudinal alignment with the crop-removing tool at the lowermost or leading end of a spiral rod that rotates about its axis of symmetry and reciprocates up and down as previously slaughtered poultry is delivered to a crop-removing and washing station. Each downward motion of the spiral rod causes the tool and nozzle to enter the vent of a bird and to exit at the neck opening. A brush and a chlorinated water spray then clean the tool and nozzle so that they are clean when they pass through the bird a second time during the upstroke of the spiral rod. Another spray of chlorinated water cleans the tool and nozzle when they have been fully retracted prior to their entry into the next bird. The nozzle produces two cone-shaped sprays that extend in opposite directions to enhance the cleaning action.

6 Claims, 4 Drawing Sheets

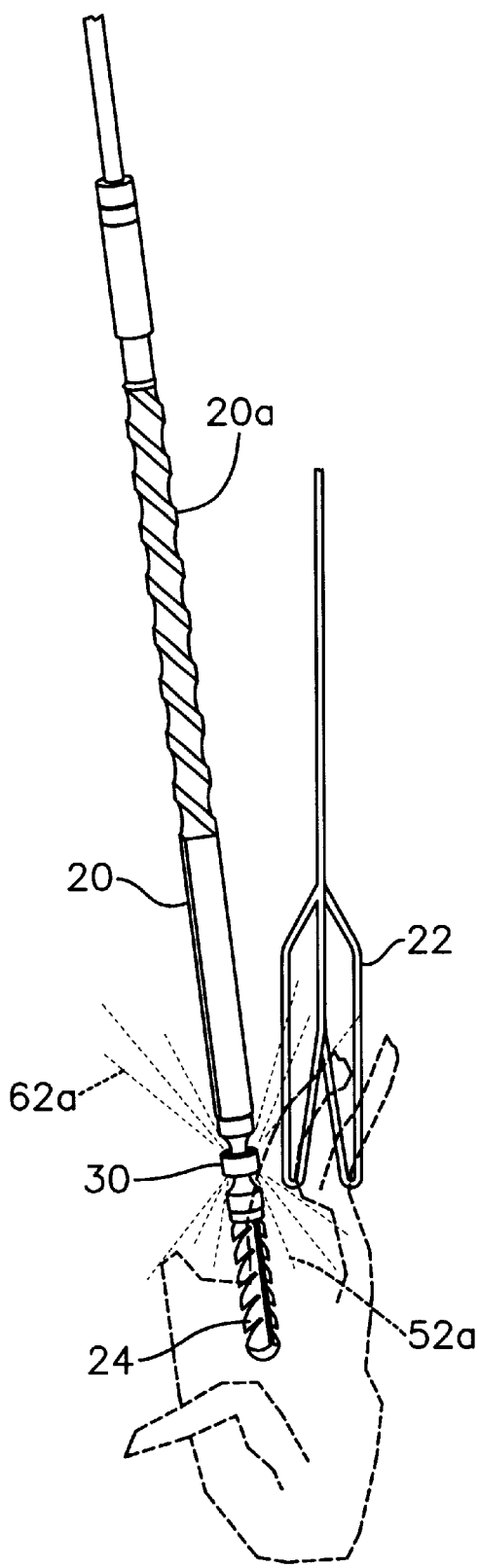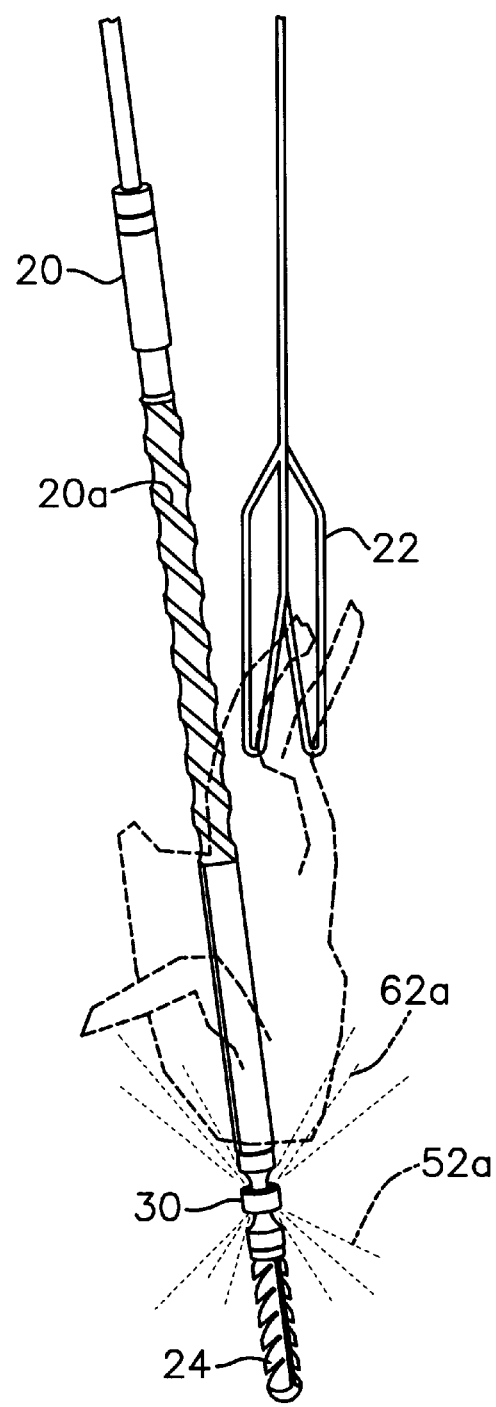
Fig. 5
Fig. 6

WATER INJECTION SYSTEM FOR POULTRY CROP REMOVER

BACKGROUND OF THE INVENTION

1. Field of the Invention

This invention relates, generally, to poultry processing devices. More particularly, it relates to a poultry cropper machine that removes contaminates from poultry through a timely and efficient use of water.

2. Description of the Prior Art

Poultry crop removing machines remove the crop and other viscera from previously slaughtered poultry animals such as chickens.

These machines typically include a shackle from which a previously slaughtered chicken or other poultry animal is suspended by its legs. The head and feathers of the animal are removed prior to the time it is attached to the shackle. A rotating device having teeth, known as a cropper, is introduced in a first direction into the chicken's vent and advanced through the digestive system thereof until it exits the chicken through the neck. The cropper removes the esophagus, the ingluvius (crop), and other viscera of the chicken, leaving an internal cavity where such viscera had been. The cropper is withdrawn from the internal cavity by displacing it in a second direction opposite to the first. The eviscerated poultry animal is then transported to a cleaning station where a cleaning device is inserted into the internal cavity to spray it with water for cleanliness purposes.

The advancement of the cropper through the body is a downward motion and the retraction of the cropper from the body requires an upward motion. An endless chain of shackles is driven by a drive means that brings the shackles to the crop removing machine, and the same endless chain carries the eviscerated poultry animals to the cleaning station.

The up and down motion of the cropper is achieved by a camming action. Specifically, the crop-removing machine includes a non-rotating frusto-conical drum having a vertical axis of symmetry. A first downwardly sloping helical deflection plate is secured to the drum. The downwardly sloping deflection plate slideably engages a protuberance that extends from a block so that the block is displaced downwardly as it rotates past the drum. The block is carried by the same drive system that carries the shackles and therefore it moves conjointly therewith. The block carries an elongate rod, known as a spiral rod, downwardly as the block is displaced downwardly by the deflection plate. The crop-removing means is formed at the lowermost end, or leading end, of the spiralted so that the crop-removing means enters the bird at its vent and exits through the neck opening during the downward stroke.

A second, upwardly sloping helical deflection plate is mounted to the drum such that its lowermost end is near the lowermost end of the downwardly sloping deflection plate. Accordingly, the protuberance formed in the block disengages from the downwardly sloping deflection plate at its lowermost end and enters into sliding engagement with the upwardly sloping deflection plate as the block follows its predetermined path of travel. This drives the block and the spiral rod upwardly so that the crop-removing means re-enters the chicken at its neck opening and exits the chicken at the vent.

The crop-removing means is typically washed with a spray of chlorinated water and a brush after it exits the neck opening on the downward stroke and again after it exits the vent on the upward stroke so that it is clean before it enters the vent of the next chicken. The brush removes the viscera from the cropper.

The block also includes a rotation means to rotate the spiral rod about its longitudinal axis of symmetry as it alternately travels upwardly and downwardly. This rotates the cropper so that teeth formed therein can better grasp the viscera and remove it. A helix is formed along a predetermined extent of the spiral rod and the helix engages a cam means within the block that effects the desired rotation of the spiral rod as it reciprocates up and down.

The primary drawback of the current apparatus, described above, is that the viscera is removed at a crop-removing station, and the interior cavity of the bird is not washed until later, at a washing station. Thus, contaminates in the interior cavity have time to become absorbed into tissue surrounding the cavity and no amount of water can properly clean the contaminates from the bird.

Processing plant owners typically request chicken farmers to turn off their chickenfeeding machines about twenty four hours before delivering the birds to the processing plant so that the stomachs of the chickens will be substantially empty upon their arrival at the plant. A bird with an empty stomach is more easily cleaned and made safe for human consumption. However, some farmers continue to feed their chickens right up to delivery time, because the chickens are sold by weight and the farmer desires a maximum payment. When a recently-fed chicken is processed, its stomach and bowel contents may be splattered about during the viscera removal process, and chickens suspended from adjacent shackles may be contaminated thereby. This requires the entire lot of chickens to be rejected for human use because no amount of water can safely and effectively clean the recently-fed chicken and the nearby chickens that may have been splattered with fecal matter and the like.

However, even when all of the chickens being processed have not been fed during the twenty four hours preceding their delivery to the processing plant, the known methods of removing the crop and other viscera and thereafter washing the interior of the bird are still inadequate because they are wasteful of water and too much time is allowed to elapse between viscera removal and interior cavity washing.

U.S. Pat. No. 3,137,031 to Ine et al. describes a method for cleaning poultry during an evisceration procedure. The method employs a device that has a simultaneous water spray and vacuum to flush and remove fecal matter from the intestines of poultry. However, the method is manually operated and is performed before the removal of any viscera or to any handling or disturbance of the bowel regions of the bird (column 4, lines 29–34). Thus, contaminates that may be spread throughout the internal cavity are not washed out after viscera removal.

U.S. Pat. No. 4,106,161 to Niccolls describes a poultry cleaning apparatus and method specifically for use after ingesta or fecal matter has been released in the abdominal cavity of the bird. This invention aims to sufficiently clean a contaminated bird that would normally be condemned for human consumption (column 1, lines 22–25). However, the structure that embodies this invention is manually operated and has utility only after contamination has occurred.

U.S. Pat. No. 4,876,767 to Harben, III et al. describes a vent cleaning apparatus and method for preparing poultry. A hollow suction probe enters the vent of the bird and a flow of water is introduced in the vicinity of the probe opening to provide a mass flow sufficient to transport loose fecal matter into the suction opening of the probe. However, the system does not relate to the removal of the viscera, but simply to the initial preparation of the bird for evisceration (column 2, lines 27–30).

U.S. Pat. No. 4,899,421 to Van Der Eerden describes another method and apparatus for removing fecal matter in poultry. The method and apparatus is applied to an automated system, but remains a separate step from the evisceration process (column 1, lines 41–48).

U.S. Pat. No. 5,041,054 to van den Nieuwelaar et al. describes a device and method for washing poultry comprising a spraying element to which cleaning liquid can be fed, and radially projecting parts, running primarily in the lengthwise direction, being disposed near the spraying element, which parts are provided with sharp projections. However, these projections are not used to remove the crop but rather to pierce and/or dislodge respiratory system membranes in the bird which may accumulate polluted cleaning liquid during the washing process (column 1, lines 38–48).

What is needed, then, is an automatic apparatus that reduces water consumption during the crop/viscera removal process. Moreover, it would be beneficial if a way could be found to combine the evisceration process and the cleaning process into one step. That would simplify the de-cropping machinery, reducing its cost and making its operation more reliable.

However, it was not obvious to those of ordinary skill in this art how the needed improvements could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and nonobvious invention. The novel apparatus for cleaning contaminates from poultry includes washing means for removing contaminate matter from an internal cavity of a poultry animal substantially simultaneously with removal of a crop therefrom. Accordingly, contaminate matter in the internal cavity is washed from the internal cavity before it can be substantially absorbed by tissue surrounding the internal cavity.

The novel apparatus further includes a crop removing means mounted in closely spaced longitudinal alignment with the washing means so that the crop removing means and the washing means are positioned within the internal cavity at substantially the same time. The crop removing means is mounted in leading relation to the washing means so that washing of the internal cavity is accomplished almost immediately after removal of the crop.

The washing means is preferably provided in the form of an elongate, hollow nozzle member having a trailing end that is disposed in fluid communication with a source of liquid fluid under pressure. A leading end of the nozzle is adapted to engage the crop removing means. The elongate nozzle member has a plurality of apertures formed therein through which the liquid fluid under pressure flows to impinge upon and clean the internal cavity.

More specifically, the elongate nozzle member further includes a hollow base member having a leading end and a trailing end, a first hollow deflection cone mounted to the hollow base member in fluid communication with the leading end thereof, and a second hollow deflection cone mounted in fluid communication with the trailing end thereof.

The hollow base member is a cylindrical member having a first end plate at its leading end and a first central aperture is formed in the first end plate. A second end plate is provided at the trailing end of the hollow base member and a second central aperture is formed therein. The first and second central apertures respectively provide fluid communication between the hollow base member and the first and second hollow deflection cones.

A first plurality of circumferentially spaced apart apertures is formed in the first end plate in radially outwardly spaced relation to the first central aperture and a second plurality of circumferentially spaced apart apertures is formed in the second end plate in radially outwardly spaced relation to the second central aperture.

The first deflection cone includes a first conical surface disposed in closely spaced apart relation to the first plurality of apertures so that liquid fluid flowing through the first plurality of apertures impinges upon the first conical surface and is directed in a first conical pattern away from the longitudinal axis of symmetry of the washing means. The first conical pattern expands in a trailing-to-leading direction.

The second deflection cone includes a second conical surface disposed in closely spaced apart relation to the second plurality of apertures so that liquid fluid flowing through the second plurality of apertures impinges upon the second conical surface and is directed in a second conical pattern away from the longitudinal axis of symmetry of the washing means. The second conical pattern expands in a leading-to-trailing direction.

It is a primary object of this invention to provide a poultry crop-removing machine that cleans contaminates from an internal cavity of a poultry animal immediately upon removal of the viscera of the animal so that said contaminates are not absorbed into tissue surrounding the internal cavity.

An object closely related to the foregoing object is to provide a crop-removing machine where the crop-removing function and the internal cavity cleaning function are performed at a single station at substantially the same time.

Another important object is to provide a crop-removing machine that conserves water.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 5 is a perspective view depicting the spray pattern of the novel washing means as it enters the vent of a shackled poultry animal; and FIG. 6 is a perspective view depicting the spray pattern of the novel washing means as it exits the neck opening of said shackled poultry animal.

DETAILED DESCRIPTION OF THE PREFERRED EMBODIMENT

Figure 1:
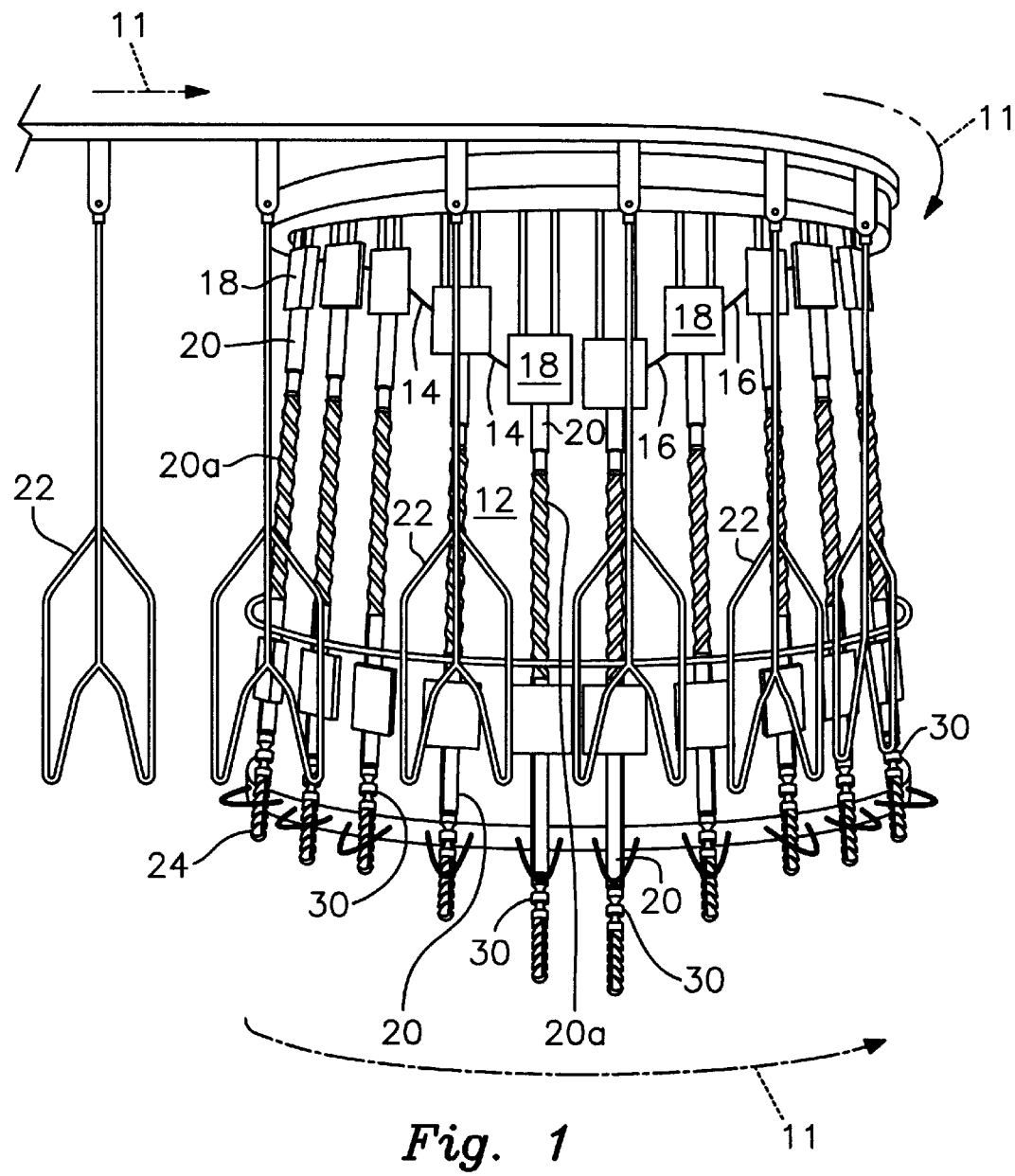
FIG. 1 is a perspective view, in diagrammatic form, of a crop-removal station.

Referring now to FIG. 1, it will there be seen that an exemplary embodiment of the invention is denoted as a whole by the reference numeral 10.

Crop-removal station 10 includes a stationary drum 12 of frusto-conical configuration. Drum 12 has a vertical axis of symmetry and includes a first, downwardly sloping helical deflection plate 14 and a second, upwardly sloping helical deflection plate 16. The lowermost end of plate 14 is in closely spaced relation to the lowermost end of plate 16. Each plate 14, 16 is secured to drum 12 in perpendicular relation to the surface thereof.

Block 18 carries hollow spiral rod 20 and both of said elements follow a path of travel around drum 12 under a motive force supplied by a drive means, not shown. A radially-inwardly extending protuberance, not shown, projects from block 18 so that when said protuberance encounters helical deflection plate 14, block 18 and hence spiral rod 20 are displaced downwardly as they rotate around the drum in the direction indicated by arrows 11. Continued travel of the block then brings the protuberance into abutting engagement with the lowermost end of upwardly sloping helical deflection plate 16 and the block and spiral rod are then displaced upwardly as they rotate about the drum. This is the up and down motion that carries the crop-removing means through the bird from vent to neck-opening and back out through the vent.

Each bird is suspended, vent end up and neck down, on a shackle means, denoted 22. The shackle means follow a predetermined path of travel through the processing plant under the motive force of the same motive means that carries the blocks. In the vicinity of crop removal station 10, each shackle moves into juxtaposition with an associated spiral rod, Since both are traveling under the motive power of the same drive means, they are traveling at the same speed and in the same direction.

A crop-removal tool 24 of conventional design is mounted at the lowermost or leading end 20a of each spiral rod 20. Tool 24 has two rows of teeth set at a right angle to one another. These teeth engage the viscera and remove it during the downward stroke of spiral rod 20. A rotating brush, not shown, cleans off said viscera when the spiral rod reaches the lowermost point in its path of travel and a spray of chlorinated water, not shown, further cleans tool 24 before it reenters the bird on the upward stroke. Another spray of chlorinated water, not shown, is applied to tool 24 at the uppermost point in its path of travel to clean it prior to entering the next shackled bird.

The helical groove 20a formed in each spiral rod 20 engages a cam means, not shown, that causes rotation of the rod as it travels upwardly and downwardly. Such rotation enhances the action of the teeth and ensures a thorough removal of viscera.

All of the above-described elements are well-known in the poultry processing industry.

Figure 2:
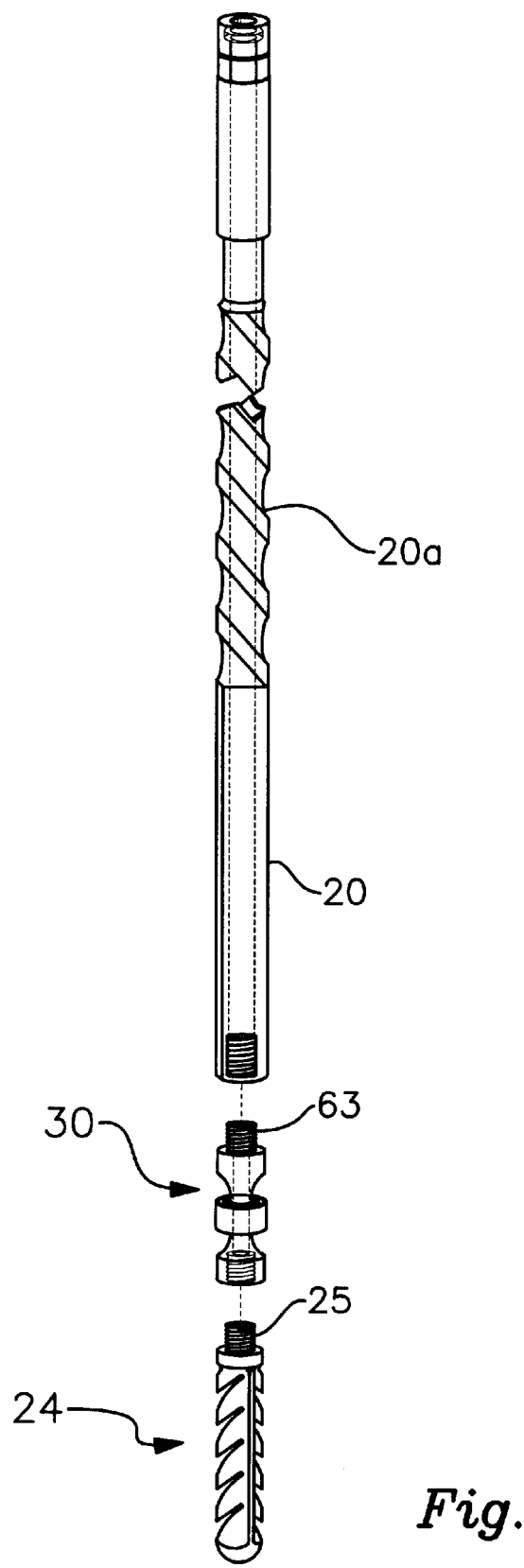
FIG. 2 is an exploded, elevational view of a spiral rod.
Figure 3:
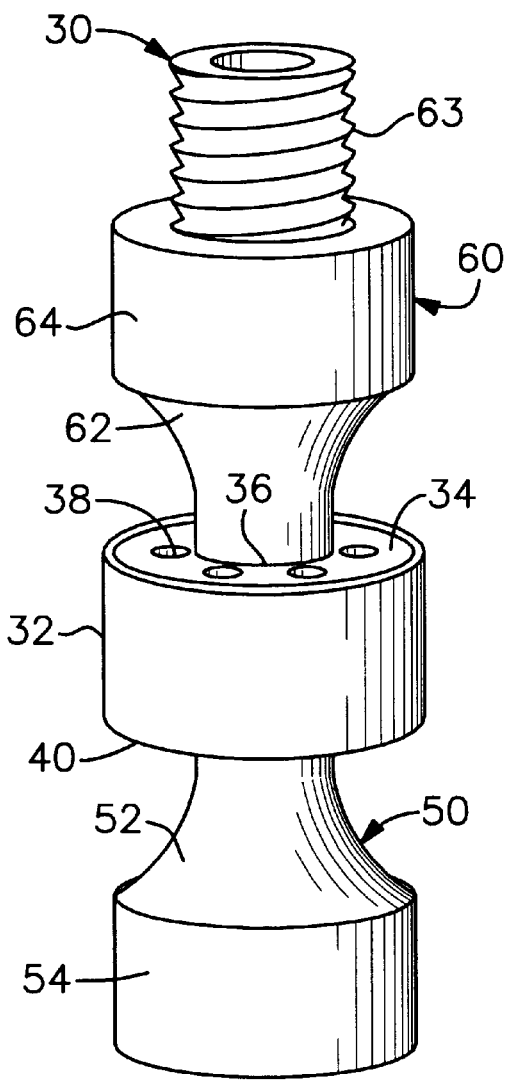
FIG. 3 is a perspective view of the novel washing means.

The revolutionary innovation that solves the contamination problem while also conserving water is denoted in FIG. 1 by the reference numeral 30. Its structure is perhaps best understood in connection with FIGS. 2 and 3.

Significantly, novel washing means 30 is disposed in longitudinal alignment with crop-removing tool 24. More particularly, it is disposed in trailing relation thereto. Thus, it washes the interior cavity of the bird substantially simultaneously with the crop removal, there being little or no time for contaminates to become absorbed by tissue surrounding the interior cavity.

It should be understood, then, that a washing means mounted adjacent to the crop-removal means is the breakthrough of this invention, and not necessarily the specific washing means used. Numerous nozzle members could perform the function of washing the internal cavity in a timely manner as long as such nozzle members are mounted adjacent the crop-removal tool as taught by this disclosure.

However, representing yet another innovation, nozzle member 30 is also inventive in its own right. It includes a hollow base member 32 of predetermined geometric configuration, preferably cylindrical. A first transversely disposed end plate 34 has a first central aperture 36 formed therein and a first plurality of apertures, collectively denoted 38, formed in radially outwardly relation to first central aperture 36 and in equidistant and circumferentially spaced relation to one another. A second transversely disposed end plate 40 has a second central aperture 42 formed therein and a second plurality of apertures, collectively denoted 44, formed in radially outwardly relation to second central aperture 42 and in equidistant and circumferentially spaced relation to one another.

A first or leading cone deflection member 50 is also of hollow construction and is mounted so that its hollow interior is in fluid communication with the hollow interior of base member 32. Leading cone deflection member 50 includes a conical surface 52 and a cylindrical main body 54.

Similarly, a second or trailing cone deflection member 60 of hollow construction is mounted to base member 32 so that the respective hollow interiors of said parts are in fluid communication with one another. Trailing cone deflection member 60 includes a conical surface 62 and a cylindrical main body 64.

An externally threaded projection 63 extends from the trailing end of cylindrical main body 64 and screw-threadedly engages the internally threaded leading end of spiral rod 20. As an equivalent structure, not shown, cylindrical main body 64 could be internally threaded for screw-threaded engagement with an externally threaded leading end of spiral rod 20.

Cylindrical main body 54 of leading cone deflection member 50 is internally threaded as at 51 (FIG. 4) to screw-threadedly receive external threads 25 (FIG. 2) formed on the trailing end of crop-removing tool 24. As an alternative structure, not shown, a hollow projection having external threads could be formed on the leading end of member 50 and said external threads could engage internal threads formed in the trailing end of crop-removing tool 24.

Figure 4:
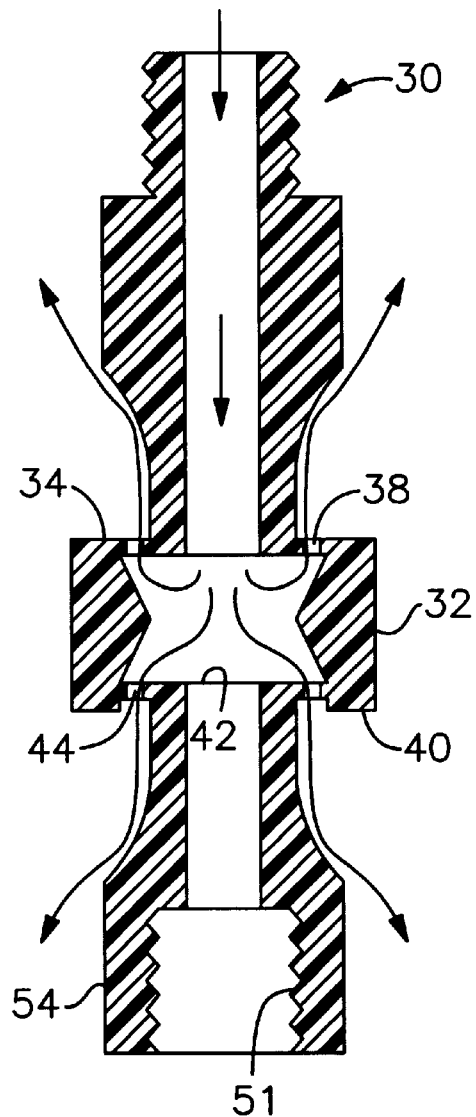
FIG. 4 is a longitudinal sectional view of the novel washing means depicted in FIG. 3.

Water under pressure is introduced into hollow spiral rod 20 at its uppermost end and said water flows through novel washing means nozzle member 30 until it encounters solid crop-removing tool 24. The only exit for said water is through radial apertures 38 and 44, formed in first and second end plates 34, 40, respectively. Water exiting said apertures flows initially along a path of travel parallel to the longitudinal axis of spiral rod 20, but said water encounters conical deflection surfaces 52, 62 as indicated in FIG. 4 and is deflected to form opposed conical spray patterns as depicted in FIGS. 4–6. Each spray pattern flows in a conical pattern including a radially outwardly component, away from the longitudinal axis of symmetry of spiral rod 20, and a longitudinal component. Specifically, leading spray pattern 52a flows in a trailing-to-leading direction and trailing spray pattern 62a flows in a leading-to-trailing direction. As indicated in FIGS. 5 and 6, this spray pattern enables a thorough cleaning of the interior cavity.

Just as importantly the cleaning process takes place almost simultaneously with the crop-removing process. The novel machine thus provides the world's first combined crop-removing and washing station, eliminating all delay between crop-removal and internal cavity washing. Significantly, this avoids the waste of an entire lot if a processed bird was fed within twenty four hours of the evisceration process because the cleaning takes place immediately and there is no chance for contaminates to be absorbed into tissue as was the case with prior art processes.

This invention represents a major breakthrough in the art of poultry processing machines. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claim is:

1. An apparatus for cleaning contaminates from poultry, comprising:
    washing means for removing contaminate matter from an internal cavity of a poultry animal;
    a crop removing means mounted in closely spaced longitudinal alignment with said washing means so that said crop removing means and said washing means are positioned within said internal cavity at substantially the same time;
    said crop removing means being mounted in leading relation to said washing means so that washing of said internal cavity is accomplished almost immediately after removal of said crop by said crop removing means;
    said washing means including an elongate, hollow nozzle member having a trailing end in fluid communication with a source of liquid fluid under pressure and having a leading end adapted to engage said crop removing means;
    said elongate nozzle member having a plurality of apertures formed therein through which said liquid fluid under pressure flows to impinge upon and clean said internal cavity; and
    said elongate nozzle member including a hollow base member having a leading end and a trailing end, a first hollow deflection cone mounted to said hollow base member in fluid communication with said leading end thereof, and a second hollow deflection cone mounted in fluid communication with said trailing end thereof;
    whereby contaminate matter in said internal cavity is washed from said internal cavity before it can be substantially absorbed by tissue surrounding said internal cavity.

2. The apparatus of claim 1, wherein said hollow base member is a cylindrical member having a first end plate at said leading end, said first end plate having a first central aperture formed therein, and a second end plate at said trailing end, said second end plate having a second central aperture formed therein, said first and second central apertures respectively providing fluid communication between said hollow base member and said first and second hollow deflection cones.

3. The apparatus of claim 2, further comprising a first plurality of circumferentially spaced apart apertures formed in said first end plate in radially outwardly spaced relation to said first central aperture and a second plurality of circumferentially spaced apart apertures formed in said second end plate in radially outwardly spaced relation to said second central aperture.

4. The apparatus of claim 3, wherein said first deflection cone includes a first conical surface disposed in closely spaced apart relation to said first plurality of apertures so that liquid fluid flowing through said first plurality of apertures impinges upon said first conical surface and is directed in a first conical pattern away from said longitudinal axis of symmetry of said washing means, said first conical pattern expanding in a trailing-to-leading direction.

5. The apparatus of claim 4, wherein said second deflection cone includes a second conical surface disposed in closely spaced apart relation to said second plurality of apertures so that liquid fluid flowing through said second plurality of apertures impinges upon said second conical surface and is directed in a second conical pattern away from said longitudinal axis of symmetry of said washing means, said second conical pattern expanding in a leading-to-railing direction.

6. A poultry ingesta removal apparatus, comprising:
    a hollow base member having a leading end, a trailing end, and a longitudinal axis of symmetry;
    a first end plate mounted in closing relation to said leading end of said hollow base member, said first end plate being mounted transversely with respect to said longitudinal axis of symmetry;
    a central aperture formed in said first end plate;
    a plurality of spray apertures formed in said first end plate in circumferentially spaced relation to one another and in radial relation to said first end plate central aperture;
    a second end plate mounted in closing relation to said trailing end of said hollow base member, said second end plate being mounted transversely with respect to said longitudinal axis of symmetry;
    a central aperture formed in said second end plate;
    a plurality of spray apertures formed in said second end plate in circumferentially spaced relation to one another and in radial relation to said second end plate central aperture;
    a first hollow deflection cone having a trailing end mounted in fluid communication with said central aperture formed in said first end plate; and
    a second hollow deflection cone mounted in fluid communication with said central aperture formed in said second end plate;
    said first hollow deflection cone adapted to engage means for removing viscera from poultry; and
    said second hollow deflection cone adapted to engage a source of liquid fluid under pressure;
    whereby liquid fluid under pressure flowing into said hollow base member flows in part through said spray apertures formed in said first end plate and is deflected in a cone pattern by said first hollow deflection cone;
    whereby liquid fluid under pressure flowing into said hollow base member flows in part through said spray apertures formed in said second end plate and is deflected in a cone pattern by said second hollow deflection cone; and
    whereby liquid fluid flowing through said spray apertures cleans an internal cavity of said poultry substantially simultaneously with viscera removal so that contaminates within said hollow cavity are removed before they can become absorbed by tissue surrounding said internal cavity.

* * * * *